United States Patent [19]
Schwanebeck et al.

[11] Patent Number: 5,524,448
[45] Date of Patent: Jun. 11, 1996

[54] MINIMUM OFF-TIME DEVICE FOR PROTECTING REFRIGERATION COMPRESSORS AFTER A POWER INTERRUPTION

[76] Inventors: James W. Schwanebeck, 2641 N. State Rd. 47; Richard J. Zelm, 3337 Sand Lake Lodge La., both of Lac Du Flambeau, Wis. 54538

[21] Appl. No.: 386,952

[22] Filed: Feb. 10, 1995

Related U.S. Application Data

[63] Continuation of Ser. No. 234,649, Apr. 28, 1994, abandoned.

[51] Int. Cl.⁶ .................................................. G05D 23/32
[52] U.S. Cl. .................................. 62/231; 62/158; 361/22
[58] Field of Search ........................ 62/231, 158; 361/22

[56] References Cited

U.S. PATENT DOCUMENTS

| | | | |
|---|---|---|---|
| 2,553,979 | 5/1951 | Newton | 62/158 X |
| 3,053,057 | 9/1962 | McGarth | 62/158 |
| 3,054,271 | 9/1962 | McGrath et al. | 62/89 |
| 3,101,432 | 8/1963 | Adams | 62/158 X |
| 3,127,754 | 4/1964 | Mobarry | 62/158 |
| 3,135,908 | 6/1964 | Harris | 62/158 X |
| 3,199,306 | 8/1965 | Paul | 62/158 |
| 3,298,192 | 1/1967 | Morgan | 62/158 |
| 3,312,081 | 4/1967 | Berger et al. | 62/158 |
| 3,422,633 | 1/1969 | Bodett | 62/158 |
| 3,559,420 | 2/1971 | Lipscomb | 62/158 |
| 3,573,486 | 4/1971 | Harris | 62/158 |
| 3,619,668 | 11/1971 | Pinckaers | 62/158 X |
| 3,620,037 | 11/1971 | Young | 62/158 X |
| 3,695,054 | 10/1972 | Barry | 62/115 |
| 3,707,661 | 12/1972 | King | 62/158 X |
| 3,796,061 | 3/1974 | Weihl | 62/158 |
| 3,796,892 | 3/1974 | Stewart | 62/158 X |
| 3,833,818 | 9/1974 | Harris | 62/158 X |
| 3,946,574 | 3/1976 | Portera | 62/230 X |
| 4,102,389 | 7/1978 | Wills | 165/29 |
| 4,128,854 | 12/1978 | Ruminsky | 62/158 X |

FOREIGN PATENT DOCUMENTS

| | | | |
|---|---|---|---|
| 0072217 | 5/1980 | Japan | 62/158 |

*Primary Examiner*—William E. Wayner
*Attorney, Agent, or Firm*—Pravel, Hewitt, Kimball & Krieger

[57] ABSTRACT

A minimum off-time device according to the present invention that delays the restart of a compressor motor of a refrigeration system after power provided to the motor has been interrupted. The minimum off-time device is a standalone unit that is located outside the refrigeration system. The device is retrofitted to the refrigeration system by simply plugging the power line of the system into the device, which is then plugged into an AC wall receptacle, or alternatively, the device can be connected between the power line of the refrigeration system and an electrical circuit breaker panel. The minimum off-time device normally allows power from the AC power source to reach the refrigeration system. However, when a power interruption occurs at the AC power source, and subsequently, power is reapplied, the minimum off-time delay device immediately disconnects the refrigeration system from the AC power source and begins a timing sequence. When the timing sequence ends after a predetermined period of time passes, the minimum off-time device reconnects the refrigeration system to the AC power source.

19 Claims, 2 Drawing Sheets

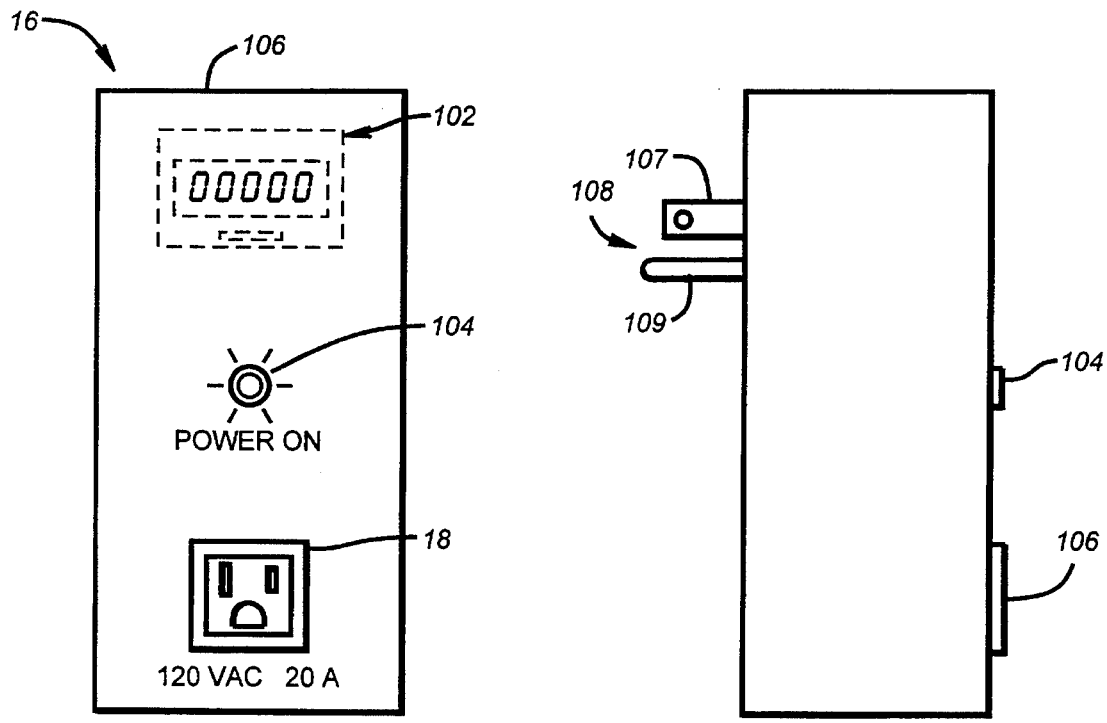
FIG. 2
FIG. 3
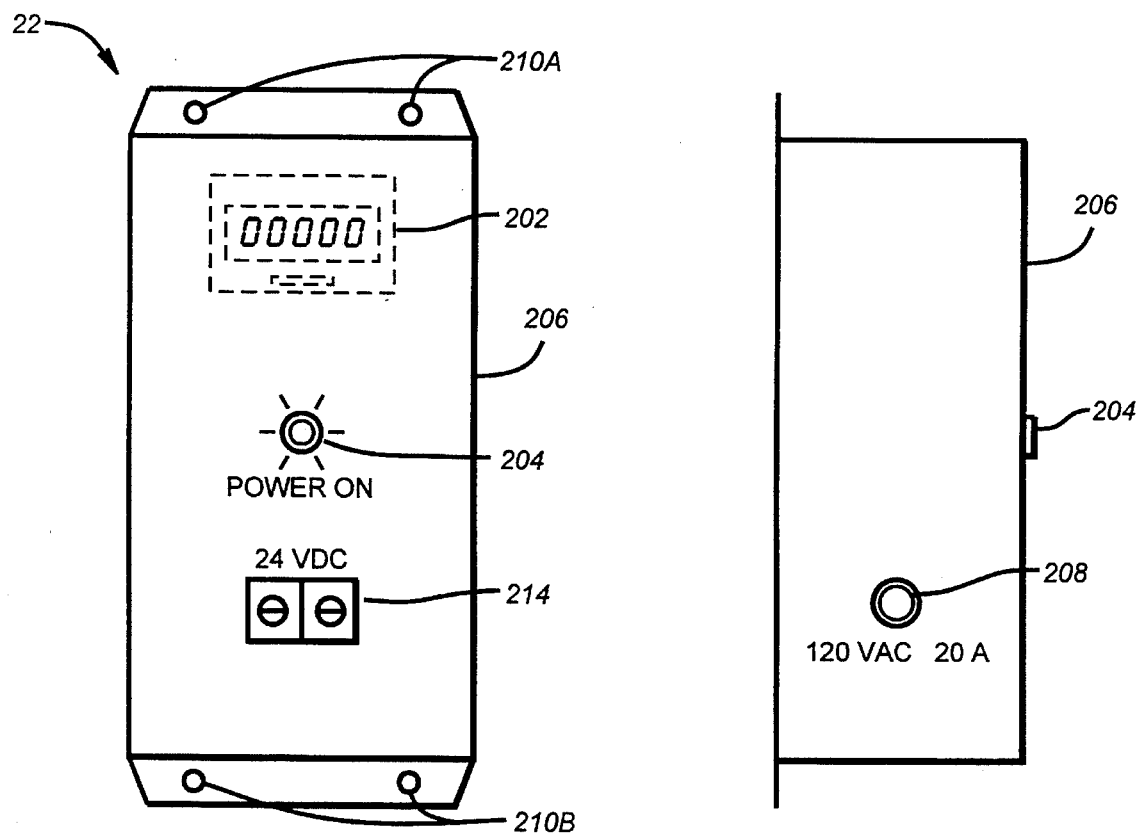
FIG. 4
FIG. 5

MINIMUM OFF-TIME DEVICE FOR PROTECTING REFRIGERATION COMPRESSORS AFTER A POWER INTERRUPTION

This is a continuation of application Ser. No. 08/234,649 filed on Apr. 28, 1994, now abandoned.

BACKGROUND OF THE INVENTION

1. Field of the Invention

The present invention relates generally to devices that delay the restarting of a compressor motor in a refrigeration system after power is interrupted until after a predetermined amount of time has expired, and more particularly, to a minimum off-time device located externally to the refrigeration system that is connected between an AC power source and the power line of the refrigeration system.

2. Description of the Related Art

In the operation of an air conditioning or a refrigeration compressor, it is desirable that once power is interrupted to the compressor that it be maintained in an off state for a minimum period of time. When a compressor is powered off momentarily during its normal operating cycle, and then restarted again quickly, it has to overcome a high head pressure built up within the system. To overcome the high head pressure, a large amount of current is passed through the motor windings, which causes the motor to overheat. The severe load on the compressor motor may shorten the motor life or even cause the motor to fail immediately. The power-interruption problem is exacerbated by the existence of a thermal overload switch equipped with some compressor motors. The thermal overload switch is placed in the motor and electrically connected to the motor control circuit. When the windings in the compressor motor begin to overheat, the thermal overload switch opens to shut the motor off. However, once the windings begin to cool down, the thermal switch resets and the motor is allowed to restart, causing the motor to heat up again. The thermal switch then trips open again to shut the motor off. The process described above is repeated, causing the motor to cycle between its on and off states. Consequently, a tremendous strain is placed on the motor, which severely shortens the life of the motor. To circumvent this problem, some thermal overload switch devices come equipped with a manual reset button. Once the thermal switch trips out, it must be manually reset to restart the compressor motor. This solution is unsatisfactory, because if the motor shut-down persists undetected, all the refrigerated products would be lost.

A solution used to prevent the problems caused by a power interruption is to employ a minimum off-time circuit located in the control circuit of the compressor motor. An interruption in current flow in the motor windings resulting from a power interruption causes the minimum off-time delay circuit to keep the starter relay or contactor, which activates the compressor motor, in a turned off state for a predetermined period of time after the loss of power. By maintaining the compressor motor in an off state for a fixed minimum time period after a power interruption, pressure in the compressor is allowed to stabilize, thereby preventing the motor from overloading when power is reapplied to the system. Although these circuits have been successful in protecting compressor motors, the cost of installing the devices into the control circuits of the systems is relatively high. Consequently, these protection devices have generally been installed only in the more expensive cooling systems, such as commercial and home central air conditioning systems. As a result, the less expensive refrigeration systems, such as residential refrigerators and freezers, window air conditioning units, and lower-end commercial refrigeration units, are left unprotected from power interruptions. However, these units too can fail, causing an expense to the owner. Furthermore, the control circuitry of these lower cost systems is also generally not amenable to retrofitting or on-site modification to include the minimum off-time delay circuitry of the larger units, even if moderate expense could be tolerated. Thus, it is desirable that a low-cost power interruption protection device exists that can be used without requiring any access to the control circuitry of the refrigeration system, thereby allowing simple use with unprotected systems.

SUMMARY OF THE PRESENT INVENTION

The minimum off-time device according to the present invention can be connected to any existing refrigeration system by simply installing the device as a stand alone unit between the AC power source and the power line of the refrigeration system. In the preferred embodiment, a power interruption causes the minimum off-time device to immediately disconnect the refrigeration system, and thus the compressor motor, from the power source. When power is restored, the device keeps the system powered off until after a predetermined period of time has expired, whereupon the system and its compressor motor are reconnected to the AC power source. The off period is set long enough to allow the compressor head pressure to equalize. By enclosing the minimum off-time devices in standalone units that can be plugged directly into an AC wall receptacle and which have an AC receptacle for receiving an AC plug from a refrigeration system, or alternatively, attached in series with wiring run for the refrigeration system, the delay circuit devices can be easily installed by the consumer, requiring little time and effort. Consequently, a convenient and low-cost solution is provided to protect compressor motors in refrigeration systems from failing as a result of power interruptions.

BRIEF DESCRIPTION OF THE DRAWINGS

A better understanding of the present invention can be obtained when the following detailed description of the preferred embodiment is considered in conjunction with the following drawings, in which:

FIG. 2 is a front view of the minimum off-time device of FIG. 1 used to connect to an AC wall receptacle;

FIG. 3 is a side view of the device of FIG. 2;

FIG. 4 is a front view of a minimum off-time device according to the preferred embodiment used to connect to a circuit breaker panel;

FIG. 5 is a side view of the device of FIG. 4; and

DETAILED DESCRIPTION OF THE PREFERRED EMBODIMENT

Figure 1:
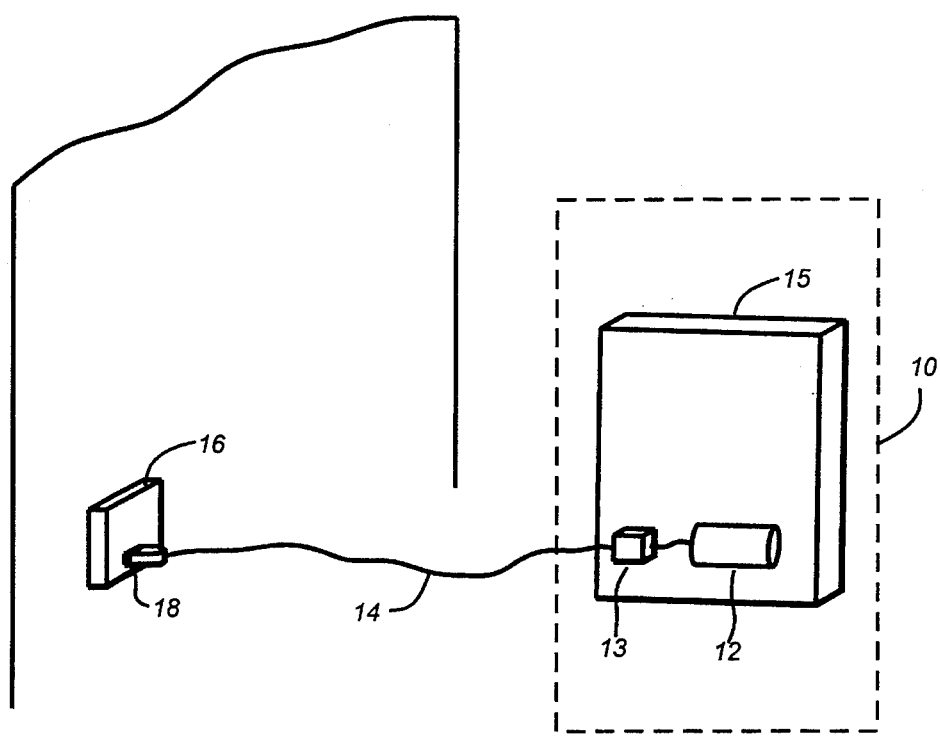
FIG. 1 illustrates a refrigeration system connected to a minimum off-time device which is plugged into the AC wall receptacle.

Referring to FIG. 1, a refrigeration system 10 utilizing the minimum off-time device according to the present invention is shown. The refrigeration system 10 comprises a refrigeration unit 15, a compressor motor unit 12, a power line 14 and control circuitry 13. Power is provided to the compressor motor unit 12 through the control circuitry 13, which is connected by the power line 14 to a minimum off-time device 16. The power line 14 is plugged into a receptacle 18 located in the minimum off-time device 16, which is plugged into an AC wall receptacle (not shown). Examples of refrigeration systems used with the device 16 include such residential appliances as refrigerators, freezers, coolers, dehumidifiers, heat pumps or window air conditioners. Since the minimum off-time device 16 is a standalone unit that works outside the refrigeration system 10, the device 16 is retrofitted to the refrigeration system 10 by simply plugging the power line 14 into the device 16. Consequently, the home user desiring such a device is provided a convenient and low-cost means of protecting the compressor unit in his or her refrigeration system. No access to the control circuitry 13 of the refrigeration system 10 is necessary.

In an alternative embodiment, the minimum off-time device 16 can be used with industrial and commercial appliances such as refrigerated display cases, ice makers, water coolers, drinking fountains or refrigerated vending machines. Used with these machines, the device 16 is mounted in an electrical circuit breaker panel instead of to the AC wall receptacle. Simple mounting instructions and hardware are provided to enable the customer or a licensed electrician to connect the device 16 to the circuit breaker panel.

Referring to FIGS. 2 and 3, the front and side views of the minimum off-time device 16 are shown, respectively. The device 16 includes a housing 106 shaped generally as a box that encloses circuitry which perform the minimum off-time function. The functionality of the circuitry will be described in FIG. 6. An optional counter 102, an indicator lamp 104 and a receptacle 18 are preferably located on the front surface of the housing 106. The optional counter 102 is provided to indicate the number of times power has been interrupted to the device 16. The indicator lamp 104 is activated when power is supplied to the receptacle 18. The indicator lamp 104 is off during the minimum off-time period after a power interruption has occurred or when power is not available from the AC wall receptacle to the device 16 through connectors 108, which are preferably located on the surface of the housing 106 facing in the opposite direction of the surface containing the counter 102, the indicator lamp 104 and the receptacle 18, such that the counter 102, the indicator lamp 104 and the receptacle 18 are visible when the device 16 is plugged into the AC wall receptacle. As shown in FIG. 3, the connectors 108 include a pair of AC connector plugs 107 and a grounding plug 109. When the device 16 is plugged into the AC wall receptacle, the receptacle 18 provides the wall supply voltage of 120/240 volts AC. The device 16 preferably has a maximum rating of 20 amps in this embodiment. The housing 106 of the device 16 is preferably three inches wide and deep and six inches high to completely cover a conventional wall receptacle and plate and to conveniently hold all the desired components while meeting various safety standards.

Referring to FIGS. 4 and 5, the front and side views of a minimum off-time device 22 for connection with refrigeration units used in industrial and commercial applications are shown, respectively. The device 22 similarly includes a housing 206 that encloses circuitry that perform the minimum off-time function. An optional counter 202 and an indicator lamp 204, located on the front surface of the housing 206, function in the same manner as the counter 102 and the indicator lamp 104 in FIG. 2. The device 22 and the device 16 are different in that the device 22 does not have a receptacle outlet or AC wall receptacle connectors. An input lead inside the minimum off-time device 22 is connected to an AC power source through a circuit breaker panel. The device 22 is attached to the circuit breaker panel or in a separate panel by means of screws threaded through openings 210A and 210B. The power line from the refrigeration system is disconnected from its circuit breaker and connected directly into the device 22 through an opening 208 preferably located in the side surface of the housing 206. The device 22 is suitably sized to receive the components.

The opening 208 is preferably sized for a ½" or a ¾" conduit connector. The input lead inside the device 22 is then brought out through the same opening 208 and connected to the circuit breaker feeding the refrigeration unit. Thus, the device is placed between the circuit breaker and the refrigeration unit being protected. Two more leads are brought out of the device 22 through the opening 208 for connection with a 120-volt AC continuous sensing source. A two pole terminal block 214 is optionally provided on the front panel of the device 22 to break the control circuitry of larger refrigeration units that are to be protected. This allows the minimum off-time device to protect large and small equipment at the same time with a single device.

Figure 6:
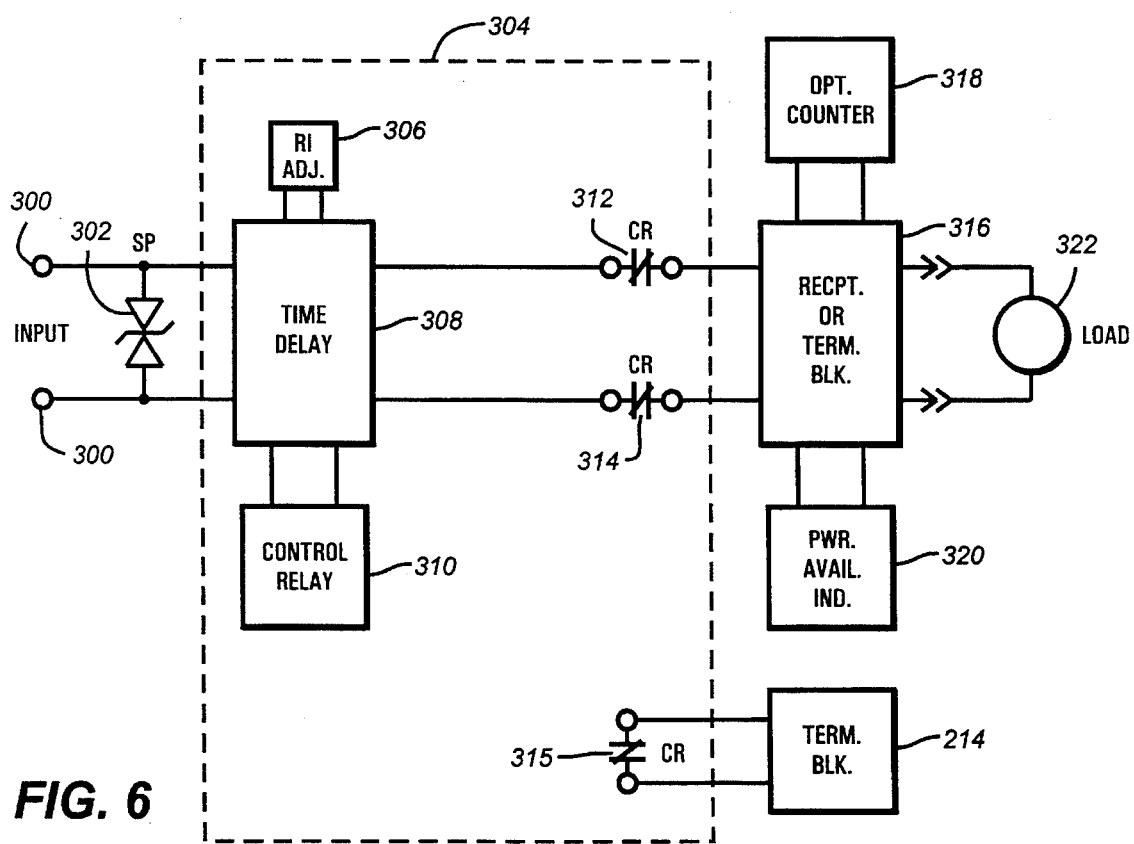
FIG. 6 is a schematic block diagram of a minimum off-time device according to the present invention.

Referring to FIG. 6, a schematic block diagram of the minimum off-time device 16 or 22 is shown. An AC supply voltage is applied at power input terminals 300. The power input terminals 300 are the connectors 108 in the case of the device 16 or terminals in a terminal block in the case of the device 22. An AC surge protector 302 is connected between the power input terminals 300. The surge protector 302 can comprise a back-to-back diode that turns on when the peak AC voltage reaches a point above the avalanche voltage of the diode. Other variations are known to those skilled in the art. When turned on, the surge protector 302 shunts current from the rest of the device, thereby protecting the device from high-current conditions. The power input terminals 300 are also connected to a time-delayed relay circuit 304, which comprises a pair of input terminals, a pair of output terminals, a time delay circuit 308, a control relay circuit 310, and a potentiometer 306. In the preferred embodiment, the time-delayed relay circuit 304 also includes two normally-closed contacts 312 and 314 that are coupled to the control relay circuit 310, in which each contact is located between the time delay circuit 308 and its respective output terminal. Both the time delay circuit 308 and the control relay circuit 310 are responsive to the application of the input voltage provided at the power input terminals 300. The pair of output terminals of the time-delayed relay circuit 304 is connected to a pair of input terminals of a receptacle or terminal block 316. Thus, when a voltage is applied at power input terminals 300, the voltage passes from the input terminals of the time-delayed relay circuit 304 through the normally-closed contacts 312 and 314 to the output terminals of the time-delayed relay circuit 304 and finally to the input terminals of the receptacle or terminal block 316. Power is thus available to a load 322 from the receptacle or terminal block 316. During the steady state power on mode, the control relay circuit 310 is in the de-energized state; as a result, the normally-closed contacts 312 and 314 remain closed. When the power switches off at the power input terminals 300, the control relay circuit 310 remains de-energized and the normally-closed contacts 312 and 314 remain closed. In the off state, no power is provided to the receptacle or terminal block 316, this being the receptacle 18 in the case of the device 16 and a terminal block in the case of the device 22. As a result, the compressor motor 12 in the refrigeration system 10 represented by the load 322 is shut off. When power is reapplied to the power input terminals 300, the control relay circuit 310 immediately turns on, which forces the normally-closed contacts 312 and 314 to open. As a result, the receptacle or terminal block 316 is disconnected from the power input terminals 300, and thus the load 322 is prevented from turning on. Power returning to the power input terminals 300 also causes the time delay circuit 308 to begin a timing sequence that ends after a predetermined period of time. When the timing sequence completes, the time delay circuit causes the control relay circuit 310 to de-energize, thereby allowing the normally-closed contacts 312 and 314 to close. By varying the resistance value of the potentiometer 306, the minimum off-time period can be adjusted. Preferably, the delay period is set between 1 minute and 10 minutes. An optional counter 318 is shown connected to the receptacle block 316. The counter 318 detects the number of times the power was interrupted to the receptacle 316. An indicator lamp 320 is also connected to the receptacle block 316 to indicate when power is available at the receptacle block 316. An optional additional contact 315 of the same type as contacts 312 and 314 is provided for use with the terminal block 214. The internal elements of the various circuits utilized in this device have not been described as they are well known to those skilled in the art.

It is noted that the contacts 312 and 314 used in the device can be configured as normally-open contacts in an alternative embodiment. If normally-open contacts are used, the control relay circuit 310 must function in an inverse manner from that which was described above. Thus, in the steady state power on mode, the control relay circuit 310 is energized to force the normally-open contacts closed. When power is interrupted at the power input terminals 300, the control relay circuit 310 is immediately de-energized and the normally open contacts are allowed to switch open. Once power is reapplied at the power input terminals 300, the time delay circuit 308 maintains the control relay circuit 310 in the de-energized state, thereby keeping the normally-open contacts open. Only when the time delay circuit 308 has completed its timing sequence is the control relay circuit 310 allowed to re-energize to force the normally-open contacts closed.

Normally-closed contacts, rather than normally-open contacts, are utilized in the preferred embodiment to enable the device to be failsafe. If the time delay circuit 308 or the control relay circuit 310 should fail for any reason, the contacts are more likely to remain closed to allow the power to flow from the power input terminals 300 to the load 322. As a result, a failure in the device will not cause power to be cut off to a refrigeration system, which would result in a costly loss of refrigerated products.

Other variations of components can be utilized to form the time-delayed relay circuit 304, so long as the functions of immediately disconnecting power from receptacle or terminal block 316 upon and during loss of power and providing a delay of reconnecting power to the receptacle or terminal block upon resumption of power on the AC line are performed. The two most preferred embodiments are described, but numerous other alternatives could be utilized.

Thus, a device used to protect compressor motors in refrigeration devices, in case of a power interruption, is described that can be quickly and easily retrofitted to an unprotected refrigeration system by the end user. The device functions by maintaining the AC power to the system in an off state for a minimum period of time after a power interruption has occurred. A device used with residential refrigeration systems provides receptacles into which the AC power lines of the systems can be plugged. The device is then plugged into a standard AC wall receptacle to complete the retrofitting procedure. Alternatively, a minimum off-time device used with commercial refrigeration systems is also easily installed by attaching the device between the power line and a circuit breaker panel. Because the devices can be retrofitted to a refrigeration system without having to rewire the system's control circuit, they provide a low cost and convenient means for protecting the refrigeration system from power interruptions.

The foregoing disclosure and description of the invention are illustrative and explanatory thereof and various changes in the size, shape and materials, components, elements, connections and contacts as well as in the details of the illustrated system and construction may be made without departing from the spirit of the invention.

We claim:

1. A minimum off-time device for connection to an external power source for use with a refrigeration system that includes a compressor motor and a power line, wherein the compressor motor is coupled to the power line, the minimum off-time device being located externally to the refrigeration system and connectable to the power line, the minimum off-time device comprising:

a time-delayed relay circuit;

means for connecting said time-delayed relay circuit to the external power source, wherein the external power source provides an input voltage to said time-delayed relay circuit;

a receptacle for connection with the power line of the refrigeration system; and means for connecting said receptacle to said time-delayed relay circuit such that said input voltage is supplied to said receptacle, wherein said time-delayed relay circuit is responsive to application of said input voltage to disconnect said input voltage from said receptacle for a predetermined time period and to reconnect said input voltage to said receptacle after said time period has lapsed.

2. The minimum off-time device of claim 1, wherein said time-delayed relay circuit comprises:

a time delay circuit connected to said means for connecting to the external power source and responsive to said application of said input voltage to start a timing sequence, said timing sequence completing after said predetermined time period; and a relay connected to said time delay circuit and said means for connecting to the external power source, said relay circuit being responsive to said timing sequence of said time delay circuit and said application of said input voltage, said relay having normally-closed contact means responsive to said relay, said relay energizing upon said application of said input voltage, causing said normally-closed contact means to open, said relay de-energizing upon the completion of said timing sequence of said time delay circuit and causing said normally-closed contact means to close.

3. The minimum off-time device of claim 2, wherein said time-delayed relay circuit further comprises means for adjusting the predetermined time period and means for connecting said adjusting means to said time delay circuit.

4. The minimum off-time device of claim 1, further comprising:

a counter connected to said receptacle for detecting the number of instances said input voltage is applied to said receptacle.

5. The minimum off-time device of claim 1, further comprising:

means for indicating power connected to said receptacle, said power indication means activating to indicate that power is available if said input voltage is connected to said receptacle.

6. A minimum off-time device for connection to an external power source for use with a refrigeration system that includes a compressor motor and a power line, wherein the compressor motor is coupled to the power line, the minimum off-time device being located externally to the refrigeration system and connectable to the power line, the minimum off-time device comprising:

a time-delayed relay circuit;

means for connecting said time-delayed relay circuit to the external power source, wherein the external power source provides an input voltage to said time-delayed relay circuit;

a receptacle for connection with the power line of the refrigeration system; and means for connecting said receptacle to said time-delayed relay circuit such that said input voltage is supplied to said receptacle, wherein said time-delayed relay circuit is responsive to application and deassertion of said input voltage by disconnecting said input voltage from said receptacle upon said deassertion of said input voltage, by remaining disconnected for a predetermined time period after said application of said input voltage, and by reconnecting said input voltage to said receptacle after said time period has lapsed.

7. The minimum off-time device of claim 6, wherein said time-delayed relay circuit comprises:

a time delay circuit connected to said means for connecting to the external power source and responsive to said application of said input voltage to start a timing sequence, said timing sequence completing after said predetermined time period; and a relay connected to said time delay circuit and said means for connecting to the external power source, said relay circuit being responsive to said timing sequence of said time delay circuit and said deassertion of said input voltage, said relay having normally-open contact means responsive to said relay, wherein said relay de-energizes upon said deassertion of said input voltage, said de-energized relay allows said normally-open contact means to open, said relay remaining de-energized upon said application of said input voltage, said relay re-energizing after said timing sequence of said time delay circuit has completed, said re-energized relay causing said normally-open contact means to close.

8. A method of protecting a refrigeration system from an interruption in power supply voltage provided by an external power source to said refrigeration system, wherein the refrigeration system includes a compressor motor and a power line, the compressor motor being coupled to the power line, the protection method comprising:

connecting the power line to a minimum off-time device responsive to application of the power supply voltage, said minimum off-time device being located externally to the refrigeration system;

connecting said minimum off-time device to the external power source, such that the power supply voltage is applied to said minimum off-time device and supplied to said refrigeration system;

disconnecting said power supply voltage from said refrigeration system upon application of said power supply voltage; and reconnecting said power supply voltage to said refrigeration system after a predetermined time period has lapsed after said application of said power supply voltage.

9. A method of protecting a refrigeration system from an interruption in power supply voltage provided by an external power source to said refrigeration system, wherein the refrigeration system includes a compressor motor and a power line, the compressor motor being coupled to the power line, the protection method comprising:

connecting the power line to a minimum off-time device responsive to application and deassertion of the power supply voltage, said minimum off-time device being located externally to the refrigeration system;

connecting said minimum off-time device to the external power source, such that the power supply voltage is applied to said minimum off-time device and supplied to said refrigeration system;

disconnecting said power supply voltage from said refrigeration system upon said deassertion of said power supply voltage;

maintaining said power supply voltage disconnected from said refrigeration system upon said application of said power supply voltage; and reconnecting said power supply voltage to said refrigeration system after a predetermined time period has lapsed after said application of said power supply voltage.

10. A minimum off-time device for connection to an external power source for use with a refrigeration system that includes a compressor motor and a power line, wherein the compressor motor is coupled to the power line, the minimum off-time device being located externally to the refrigeration system and connectable to the power line, the minimum off-time device comprising:

a housing having two parallel and separated faces;

contact means for connection with the external power source being located on one face of said housing;

a receptacle for connection with the power line of the refrigeration system being located on the other face of said housing, said receptacle being accessible to the power line of the refrigeration system when said housing is connected to the external power supply through said contact means;

circuitry being located and enclosed within said housing, said circuitry including:

a time-delayed relay circuit;

means for connecting said time-delayed relay circuit to said contact means, wherein the external power source applies an input voltage to said time-delayed relay circuit; and means for connecting said receptacle to said time-delayed relay circuit such that said input voltage is supplied to said receptacle, wherein said time-delayed relay circuit is responsive to application of said input voltage to disconnect said input voltage from said receptacle for a predetermined time period and to reconnect said input voltage to said receptacle after said time period has lapsed.

11. The minimum off-time device of claim 10, wherein said time-delayed relay circuit comprises:

a time delay circuit connected to said contact means and responsive to said application of said input voltage to start a timing sequence, said timing sequence completing after said predetermined time period; and a relay connected to said time delay circuit and said contact means, said relay being responsive to said timing sequence of said time delay circuit and said application of said input voltage, said relay having normally-closed contact means responsive to said relay, said relay energizing upon said application of said input voltage, causing said normally-closed contact means to open, said relay de-energizing upon the completion of said timing sequence of said time delay circuit and causing said normally-closed contact means to close.

12. The minimum off-time device of claim 11, wherein said time-delayed relay circuit further comprises means for adjusting the predetermined time period and means for connecting said adjusting means to said time delay circuit.

13. The minimum off-time device of claim 10, further comprising:

a counter located in said housing and being visible when said housing is connected to said external power supply, said counter being connected to said receptacle for detecting the number of instances said input voltage is applied to said receptacle.

14. The minimum off-time device of claim 10, further comprising:

means for indicating power located in said housing and being visible when said housing is connected to said external power supply, said power indication means being connected to said receptacle, said power indication means activating to indicate that power is available if said input voltage is connected to said receptacle.

15. A minimum off-time device for connection to an external power source for use with a refrigeration system that includes a compressor motor and a power line, wherein the compressor motor is coupled to the power line, the minimum off-time device being located externally to the refrigeration system and connectable to the power line, the minimum off-time device comprising:

a housing having two parallel and separated faces;

contact means for connection with the external power source being located on one face of said housing;

a receptacle for connection with the power line of the refrigeration system being located on the other face of said housing, said receptacle being accessible to the power line of the refrigeration system when said housing is connected to the external power supply through said contact means;

circuitry being located and enclosed within said housing, said circuitry including:

a time-delayed relay circuit;

means for connecting said time-delayed relay circuit to said contact means, wherein the external power source applies an input voltage to said time-delayed relay circuit; and means for connecting said receptacle to said time-delayed relay circuit such that said input voltage is supplied to said receptacle, wherein said time-delayed relay circuit is responsive to application or deassertion of said input voltage, disconnecting said input voltage from said receptacle upon said deassertion of said input voltage, remaining disconnected for a predetermined time period after said application of said input voltage, reconnecting said input voltage to said receptacle after said time period has lapsed.

16. The minimum off-time device of claim 15, wherein said time-delayed relay circuit comprises:

a time delay circuit connected to said contact means and responsive to said application of said input voltage to start a timing sequence, said timing sequence completing after said predetermined time period; and a relay connected to said time delay circuit and said contact means, said relay being responsive to said timing sequence of said time delay circuit and said deassertion of said input voltage, said relay having normally-open contact means responsive to said relay, wherein said relay de-energizes upon said deassertion of said input voltage, said de-energized relay allowing said normally-open contact means to open, said relay remaining de-energized upon said application of said input voltage, said relay re-energizing after said timing sequence of said time delay circuit has completed, said re-energized relay causing said normally-open contact means to close.

17. The minimum off-time device of claim 16, wherein said time-delayed relay circuit further comprises means for adjusting the predetermined time period and means for connecting said adjusting means to said time delay circuit.

18. The minimum off-time device of claim 15, further comprising:

a counter located in said housing and being visible when said housing is connected to said external power supply, said counter being connected to said receptacle for detecting the number of instances said input voltage is applied to said receptacle.

19. The minimum off-time device of claim 15, further comprising:

means for indicating power located in said housing and being visible when said housing is connected to said external power supply, said power indication means being connected to said receptacle, said power indication means activating to indicate that power is available if said input voltage is connected to said receptacle.

* * * * *